United States Patent [19]

Kaku et al.

[11] Patent Number: 4,571,733
[45] Date of Patent: Feb. 18, 1986

[54] AUTOMATIC EQUALIZATION DEVICE AND METHOD OF STARTING-UP THE SAME

[75] Inventors: Takashi Kaku, Tama; Shigeyuki Unagami, Zama; Masayoshi Inoue, Kawasaki, all of Japan

[73] Assignee: Fujitsu Limited, Kawasaki, Japan

[21] Appl. No.: 527,573

[22] PCT Filed: Dec. 28, 1982

[86] PCT No.: PCT/JP82/00479
  § 371 Date: Aug. 17, 1983
  § 102(e) Date: Aug. 17, 1983

[87] PCT Pub. No.: WO83/02373
  PCT Pub. Date: Jul. 7, 1983

[30] Foreign Application Priority Data

Dec. 28, 1981 [JP] Japan .................. 56-214604

[51] Int. Cl.⁴ .................. H04B 3/06; H04B 3/10
[52] U.S. Cl. .................. 375/13; 333/18
[58] Field of Search .................. 375/12, 13, 14, 39; 333/18; 364/724, 728; 328/166; 455/312

[56] References Cited

U.S. PATENT DOCUMENTS

| | | | |
|---|---|---|---|
| 4,047,013 | 9/1977 | Milewski | 375/13 |
| 4,089,061 | 5/1978 | Milewski | 375/13 |
| 4,430,743 | 2/1984 | Watanabe | 333/18 |
| 4,441,192 | 4/1984 | Kita et al. | 333/18 |

Primary Examiner—Benedict V. Safourek
Attorney, Agent, or Firm—Staas & Halsey

[57] ABSTRACT

An automatic equalization device used in a data communication system includes a unit for extracting a single pulse from a training signal sent from a transmitter and initializing a tap coefficient using the extracted single pulse. The automatic equalization device also includes a first equalization circuit and a second equalization circuit. In the first equalization circuit, an auto-correlation series of the signal corresponding to the single pulse is calculated to provide a symmetric single pulse. In the second equalization circuit, an inverse matrix is calculated from the symmetric single pulse using the auto-correlational series of single pulses. By these calculations, the speed of the initial setting of the tap coefficient is increased.

8 Claims, 5 Drawing Figures

AUTOMATIC EQUALIZATION DEVICE AND METHOD OF STARTING-UP THE SAME

BACKGROUND OF THE INVENTION

The present invention relates to an automatic equalization device provided in a modem in a receiver in a digital data transmission system and to a method of starting-up the automatic equalization device, particularly a method for starting-up an automatic equalization device at a high speed.

In a multipoint communication system, a master station communicates selectively with one of a plurality of the slave stations. A transmitter and a receiver of the master station are connected through a telephone transmission line with receivers and transmitters of the slave stations. In such a type of communication system, the transmitter of the master station is always connected in an on-line manner with the receivers of the slave stations. The master station polls each of the salve station in sequence. Such a polled slave station transmits an "acknowledgement" signal in response to a received "request for transmission" signal and subsequently transmits the data if the slave station has data to be transmitted.

It is necessary for a modem to adjust its receiver characteristics to the characteristics of the telephone transmission line prior to the actual receipt of data from one of the slave stations. The characteristics of the telephone transmission line vary for each slave station, primarily because of the change of distance between the master station and slave stations. Once the receiver is adjusted to the telephone transmission line, it is possible to satisfactorily track the change of line characteristics using known, relatively slow speed methods. However, when the receiver first receives the training data, there is a great difference in the characteristics of the receiver and the characteristic of the line. Under such start-up conditions, it takes about 2 seconds to adjust the receiver to the line by the known, relatively slow speed tracking method. The total adjustment time for one request for transmission equals the unit adjustment time multiplied by the number of the slave stations. This total adjustment time is a key factor which significantly reduces the efficiency of data transmission in prior art systems.

Various proposals have been made to provide a special start-up procedure to facilitate the quick adjustment of the receiver to the telephone transmission line. Typical of these is the transmission from the transmitter of a special signal series by which the receiver can derive a signal having the characteristic of the telephone transmission line for the receiver itself. In accordance with this special signal series, a timing error signal and a phase error signal are generated. Using these, an equalization device or the like in the receiver is started up.

As the signal series, i.e., the training signal for the start-up of the equalization device CCITT recommendations prescribe the transmission of a binary pseudo random data code (hereinafter referred to as a PN code). Hence, various methods have been proposed in which, to initialize the correction coefficient (tap coefficient) of the equalization device from the PN code, the correlation between the data and the error signal is calculated and used to correct and determine the tap coefficient. However, such methods have disadvantages of requiring a large, complicated circuit for calculating the correlation and requiring a considerably long time for determining the tap coefficient of the equalization device. For example, about 250 msec are required from a request for transmission to the transmission of the data.

U.S. Pat. No. 3,962,637 to David M. Motley et al. proposed a method for the high-speed start-up of an equalization device in a receiver. In this U.S. patent, a special signal comprising the three segments mentioned below is used for the training signal for the start-up of the equalization device.

That is, in the first segment, a tone signal obtained by modulating a carrier signal in a predetermined phase and amplitude is transmitted. In the second segment, a signal obtained by modulating the carrier signal by the data series by which data series the transmission timing, i.e., band rate clock period, can be discriminated, is transmitted. In the third segment a signal obtained by modulating the carrier signal by single pulse (impulse) data is transmitted.

On the other hand, in the receiver, automatic gain control is carried out in the first segment of the training signal, a timing signal for sampling the data is extracted in the second segment and the single pulse signal is extracted in the third segment.

The single pulse signal extracted in the third segment has been deformed by the transfer function (impulse response characteristic) of the transmission line. The equalization device in the receiver compensates the distortion (deformation) of the signal on the line. Fundamentally, it is ideal that the equalization device have inverse characteristics of the transfer function of the line. Accordingly, in the above-referenced U.S. patent, the tap coefficient is calculated and determined on the basis of the impulse response characteristics of the transmission line extracted in the third segment of the training signal such that the equalization device has inverse characteristics of the line.

The technique disclosed in the above-referenced U.S. patent greatly reduces the time required for initializing the tap coefficient of the equalization device in the receiver compared with the case where the above-described PN code is used. For example, the time required from a request for transmission to transmission of data can be reduced to less than 30 msec.

However, in the technique disclosed in the above-referenced U.S. patent, the impulse signal extracted in the third segment of the training signal is, in general, asymmetrical with respect to time. To obtain the tap coefficient of an equalization device having inverse characteristics using such an asymmetrical signal requires more calculation time than in the case where a symmetric signal is used.

Also, in the disclosed technique, the signal transmitted on the line in the above-described third segment does not contain the carrier signal except when the single pulse signal exists. Hence, even if the phase of carrier signal for demodulation in the first and the second segment is adjusted, the phase is not adjusted in the third segment. Accordingly, there is the disadvantage that the phase cannot necessarily be guaranteed. Further, in the third segment, there is a possibility of asynchronism, since no timing signal for sampling is extracted.

SUMMARY OF THE INVENTION

A first object of the present invention is to speed up the start-up of the automatic equalization device in a receiver and thereby improve the efficiency of data transmission in a multipoint communication system.

A second object of the present invention is to decrease the time necessary for the initialization of the tap coefficients, in an automatic equalization device in which the impulse response characteristic of the line are used for the initialization of the tap coefficients, by providing a first and a second equalizer unit and by making the impulse response characteristics symmetrical with respect to time by the first equalizer unit.

A third object of the present invention is to provide a method of starting up an automatic equalization device of the above-mentioned type in which the phase of the carrier signal can be guaranteed even in the segment for extracting an impulse response signal.

A fourth object of the present invention is to provide a method of starting up an automatic equalization device in which the timing signal can be extracted and hence asynchronium can be prevented even in the above-mentioned segment for extracting an impulse signal.

In accordance with the present invention, there is provided an automatic equalization device which is arranged in a receiver for receiving through a transmission line and demodulating a signal obtained by quadrature-amplitude modulating a carrier signal by digital data in a transmitter, and which compensates for the distortion introduced into the received signal by the transmission line. The automatic equalization device comprises a single pulse extraction circuit for extracting a signal corresponding to a single pulse containing distortion due to the transmission line from a predetermined training signal received for starting up the receiver before receiving the data signal and comprises first and second equalization circuits. The single pulse extraction circuit has a means for generating a data series expressing by complex numbers the signal corresponding to the single pulse, a means for normalizing the data series, and a means for deriving the complex conjugates of the normalized data series. The first equalization circuit has a means for calculating an auto-correlation series of the signal corresponding to the single pulse from the normalized data series using the complex conjugate data series as the tap coefficient and has a means for calculating a cross-correlation series between the data signal series received after start-up and the signal corresponding to the single pulse using the complex conjugate data series as the tap coefficient. The second equalization circuit has a means for obtaining the N-th order approximate data series of the inverse matrix of the auto-correlation series using the auto-correlation series obtained in the first equalization circuit, a means for obtaining the data series corresponding to the above-mentioned inverse matrix from the N-th order approximate data series by means of the successive approximation method, and a means for obtaining an equalized output from the cross-correlation series of the received data signal supplied from the first equalization circuit by setting the data series corresponding to the inverse matrix as the initialization tap coefficient.

DETAILED DESCRIPTION OF THE PREFERRED EMBODIMENT

Figure 1:
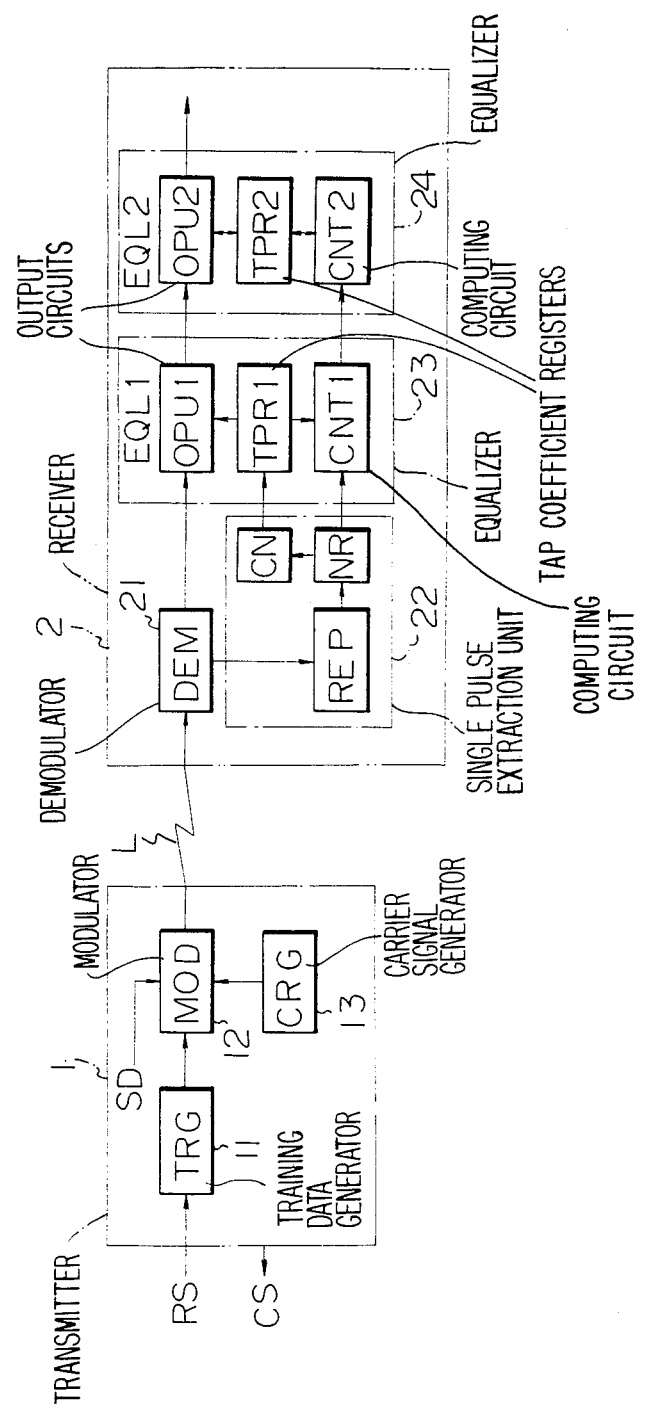
FIG. 1 illustrates a system for data transmission and reception in which an automatic equalization device according to the present invention is used.

An automatic equalization device and a method of starting up the same according to the present invention will now be described with reference to the drawings. A receiver equipped with an automatic equalization device according to the present invention is illustrated in FIG. 1. In FIG. 1, when a transmitter 1 receives a transmission request signal (RS), it generates training data in a training data generating unit (TRG) 11 and supplies the training data to the modulation unit (MOD) 12. MOD 12 carries out quadrature-amplitude modulation on the carrier signal from a carrier signal generating unit (CRG) 13 based on the training data and transmits the modulated signal to the receiver 2 through the transmission line L. In the receiver 2, the setting of the starting-up condition for receiving the data signal is carried out on basis of the received training signal. Predicting the time when the setting of the starting-up condition will be finished, the transmitter 1 generates a transmission ready signal CS and starts to transmit the signal modulated by the transmitting data SD to the receiver 2.

Figure 2:
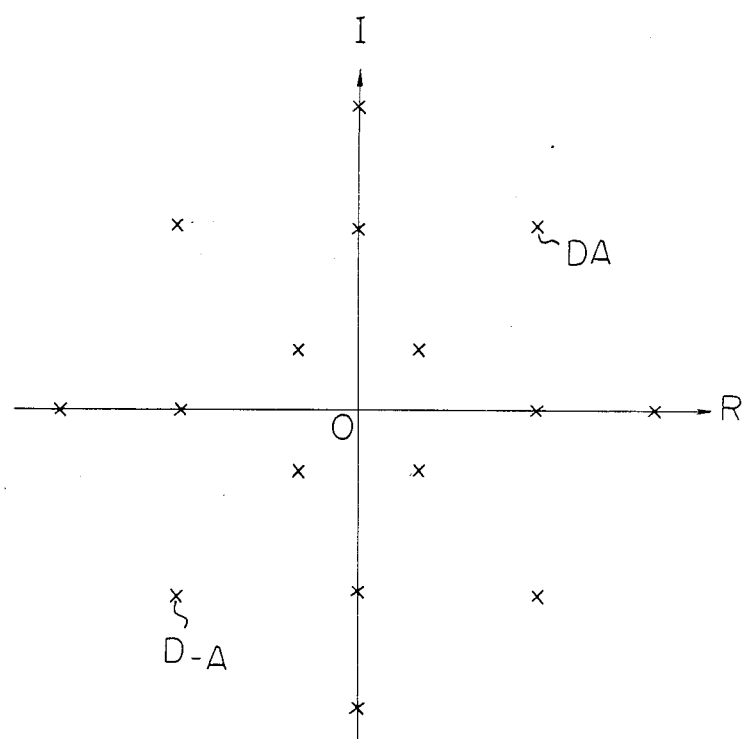
FIG. 2 illustrates one example of the modulation points in the quadrature-amplitude modulation used in the system for data transmission and reception of FIG. 1.

The modulation unit 12 of the transmitter 1 carries out quadrature amplitudie modulation into 16 values on the carrier signal from the carrier generating unit 13 as shown, for example, in FIG. 2. For reference, each signal point shown in FIG. 2 corrsponds to the amplitude and phase of the modulated signal and can be expressed in a complex number notation.

The receiver 2 of FIG. 1 comprises a demodulation unit (DEM) 21 for receiving and demodulating the signal transmitted from transmitter 1, a single pulse extraction unit 22 for extracting a signal corresponding to a single pulse signal from the training data demodulated in the demodulation unit 21, and a first and a second equalizer unit (EQL 1 and EQL 2) started up on the basis of the extracted data corresponding to the single pulse signal. An example of the training data containing a data series from which a single pulse signal can be extracted is shown in FIG. 3.

Figure 3:
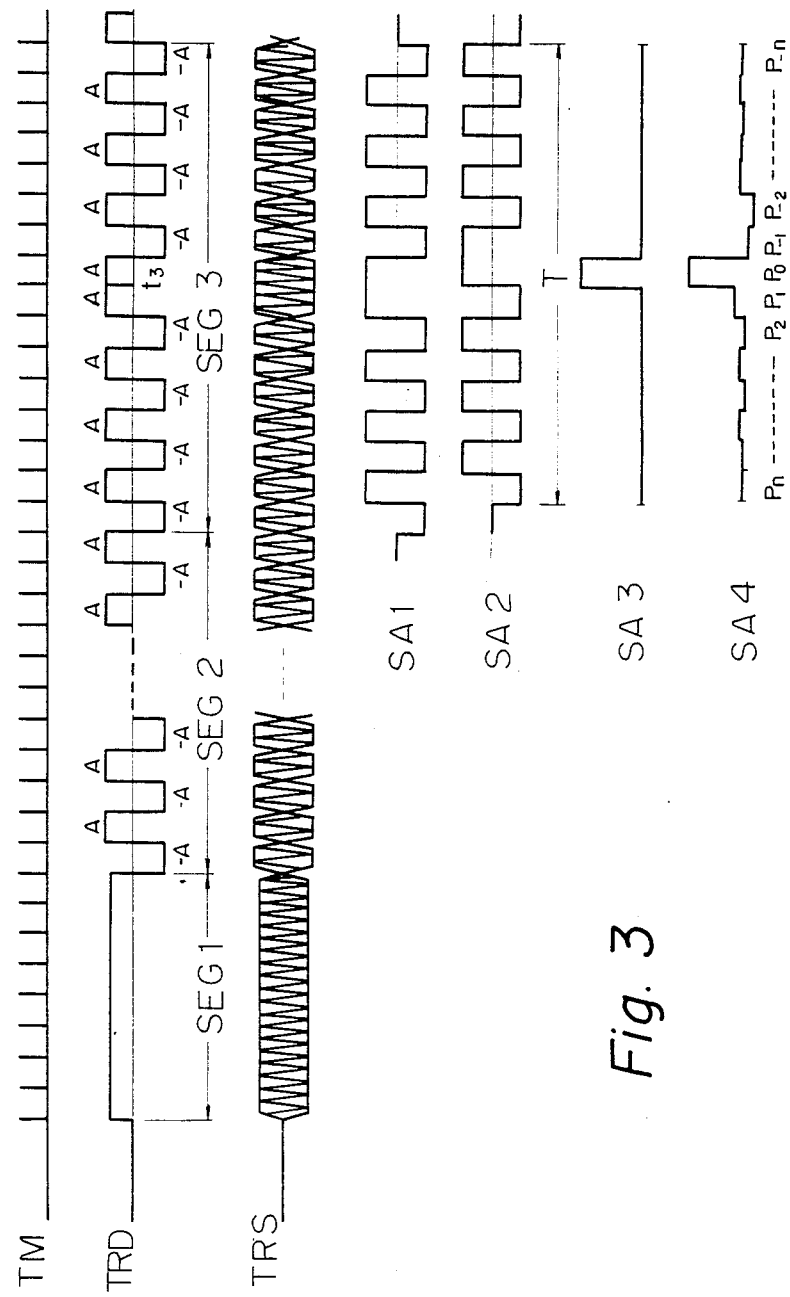
FIG. 3 illustrates signal waveforms of one example of the training signal used in a method of starting up an automatic equalization device according to the present invention.

In FIG. 3, TM is a timing signal for data transmission, TRD is training data, and TRS is a carrier signal modulated by TRD. The training data TRD has three segments SEG1, SEG2, and SEG3. In the first segment SEG1, the training signal TRS is a signal modulated with constant data and hence has a constant amplitude and a constant phase. Thus, in the demodulation portion (DEM) 21 of the receiver 2, the adjustment of the automatic gain control AGC can be carried out while this first segment SEG1 is received. In the second segment SEG2, the training signal TRS is modulated alternately with two data "A" and "−A" which have the opposite phase and the same amplitude. For example, such two data "A" and "−A" are shown as $D_A$ and $D_{-A}$ in FIG.

2. The timing signal for data transmission is extracted from the signal in the second segment SEG2.

The training data in the third segment SEG3 is alternately expressed as data "A" and "−A" except at time t3 where the data "A" appears successively. In FIG. 3, SA1 shows only a portion of the training data in the third segment SEG3, and SA2 shows that obtained by delaying it by one data symbol. By summing up the signals SA1 and SA2 in the period T where these two signals overlap, a single pulse series as shown in SA3, that is, a series in which not only a center element $P_0$ is zero, but all other elements are also zero, is obtained.

Figure 4:
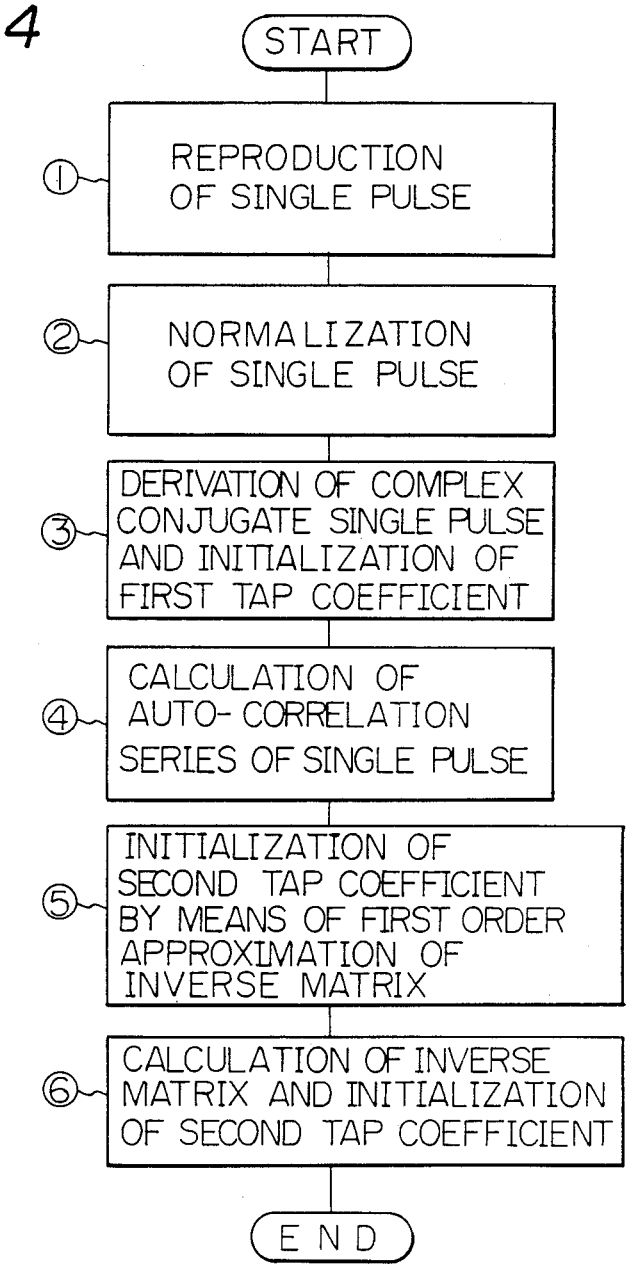
FIG. 4 is an abbreviated flow chart of the method of starting up an automatic equalization device according to the present invention.

A flow chart of the start-up of the automatic equalization device of the receiver 2 in FIG. 2 using the training signal of FIG. 3 is illustrated in FIG. 4. In the first step ①, the received data series (expressed in complex numbers) corresponding to the third segment SEG3 of the training signal demodulated in the demodulation unit 21 is supplied to the single pulse extraction circuit REP. In REP, the received data series is added to one obtained by delaying that data series by one data symbol. Thus, a data series $P_J (J=0, \pm 1, \ldots, \pm n)$ as shown in SA4 of FIG. 3 is obtained. This data series $P_J$ may be deemed an ideal single pulse shown in FIG. 3 distorted by the transmission line L. In the second step ②, the data series $P_J$ corresponding to the single pulse extracted as described above is supplied to the normalization circuit NR, and is normalized in NR. The normalization circuit NR first calculates the magnitude of the data series $P_J$, that is, the 0-th order correlation $P^2$, according to the following equation:

$$P^2 = P_n P_n^* + P_{n-1} \cdot P_{n-1}^* + \ldots + P_0 \cdot P_0^* + \ldots + P_{-n} \cdot P_{-n}^*$$

That is, $$P^2 = \sum_{K=-n}^{n} P_K \cdot P_K^*$$

(herein, * denotes complex conjugate). Then, the single pulse is normalized by dividing the data series $P_J$ by P. Assuming that the normalized data series is $X_J$, then $X_J = P_J/P$.

In the third step ③, the normalized data series $X_j$ is supplied to the complex conjugate derivation circuit CN. The derived complex conjugate data series $C_J$ is initialized in the first tap coefficient register TPR1 as the tap coefficient of the first equalization circuit (EQL1) 23. Here, $C_J = x_J^* = P_J^*/P$. In the fourth step ④, the normalized data series $x_J$ and its complex conjugate data series $C_J$ are supplied to the computing circuit CNT1 of the first equalization circuit 23, and the auto-correlation series $A_m$ is calculated. The calculation of the auto-correlation series $A_m$ is carried out as follows. First, regarding the 0-th order correlation $A_0$, $$A_0 = \sum_{K=-n}^{n} x_K \cdot C_K = \sum_{K=-n}^{n} (P_K/P) \cdot (P_K^*/P)$$

$$= \sum_{K=-n}^{n} P_K \cdot P_K^*/P^2 = (1, 0)$$

Here, a complex number is expressed in the form of (real component, imaginary component). Regarding the other $A_m$'s, $$A_m = \sum_{K=-n}^{n} x_{K+m} \cdot C_K = \sum_{K=-n}^{n} (P_{K+m}/P) \cdot (P_K^*/P)$$

$$= \sum_{K=-n}^{n} P_{K+m} \cdot P_K^*/P^2 = \sum_{K=-n}^{n} P_{K+m} \cdot$$

$$P_K^* / \sum_{K=-n}^{n} P_K \cdot P_K^*$$

From this, it can be seen that $A_{-m} = A_m^*$. That is, the auto-correlation series $A_m$ is symmetric. This auto-correlation series $A_m$ can be thought of as the result of deformation of a single pulse by the transmission line L and the first equalization circuit EQL1. Therefore, it is required to give an inverse characteristic of the symmetric impulse characteristic in the second equalization circuit (EQL2) 24.

In the fifth step ⑤, the auto-correlation series $A_m$ is supplied to the computing circuit CNT2 of the second equalization circuit (EQL2) 24, and the first-order approximate series $B_J^{(1)}$ of the inverse characteristic matrix is obtained as follows.

$$B_J^{(1)} = -A_{-J} = -A_J^* (J \neq 0)$$

$$B_0^{(1)} = A_0 = (1, 0)$$

The series $B_J^{(1)}$ obtained as above is used as the initial condition for obtaining the inverse matrix.

In the sixth step ⑥, the data series $B_J^{(1)}$ obtained in the fifth step ⑤ is used as the tap coefficient $B_J$ of the second equalization circuit to calculate the equalized output S with the auto-correlation series $A_m$ as the tap data. Then, the output S is compared with the reference output series Ref, and the tap coefficient $B_J$ is corrected successively so as to make the error approach zero. The equalized output S is the data series $S_L$ given as follows:

$$S_L = \sum_{K=-n}^{n} B_K \cdot A_{K+L}$$

The correction of the tap coefficient $B_J$ is carried out by using the following successive approximation method:

$$B_0^{(n+1)} = B_0^{(n)} + E \cdot A_0^*$$
$$= B_0^{(n)} + (Ref - S) \cdot 1$$
$$= B_0^{(n)} + Er$$

($E_r$ is the real part of E)

Regarding other $B_J$ is, $$B_J^{(n+1)} = B_J^{(n)} + E \cdot A_0^*$$
$$= B_J^{(n)} + E$$
$$= B_J^{(n)} + (Ref - S)$$
$$= B_J^{(n)} - S_J$$

In addition, since the center tap is dominant, the correction of $B_J$ is carried out in the following sequence:

$$B_0 \rightarrow B_{\pm 1} \rightarrow B_{\pm 2} \rightarrow \cdots \rightarrow B_{\pm n} \rightarrow B_0 \rightarrow B_{\pm 1} \rightarrow \cdots$$

Since the input series $A_m$ of the second equalization circuit is symmetric, the data series $B_J$ obtained as described above is also symmetric. That is, $B_J = B_{-J}^*$. As described above, the tap coefficient $B_J$ of the second equalization circuit 24 is initialized and set in the tap coefficient register TPR2.

After the above-mentioned steps, the initialization of the tap coefficient of the automatic equalization device is completed. Predicting the time when the start-up in the receiver 2 is completed as described above, the transmitter 1 starts to transmit the transmission data. In the receiver 2, the received data signal is demodulated in the data series in the demodulation unit 21 and supplied to the first equalization circuit 23. In the first equalization circuit 23, the first equalized output is calculated from the received data series by the first equalized output circuit OPU1 using the tap coefficient $C_j$ in the first tap coefficient register TPR1. The equalized output data series from the first equalization circuit 23 is supplied to the equalized output circuit OPU2 of the second equalization circuit 24, and the final equalized output data is calculated using the second tap coefficient $B_j$. By way of reference, it is possible to form a single equalized output circuit for the received data by calculating a combined tap coefficient from the first tap coefficient $C_j$ and the second tap coefficient $B_j$ by a convolution operation.

Figure 5:
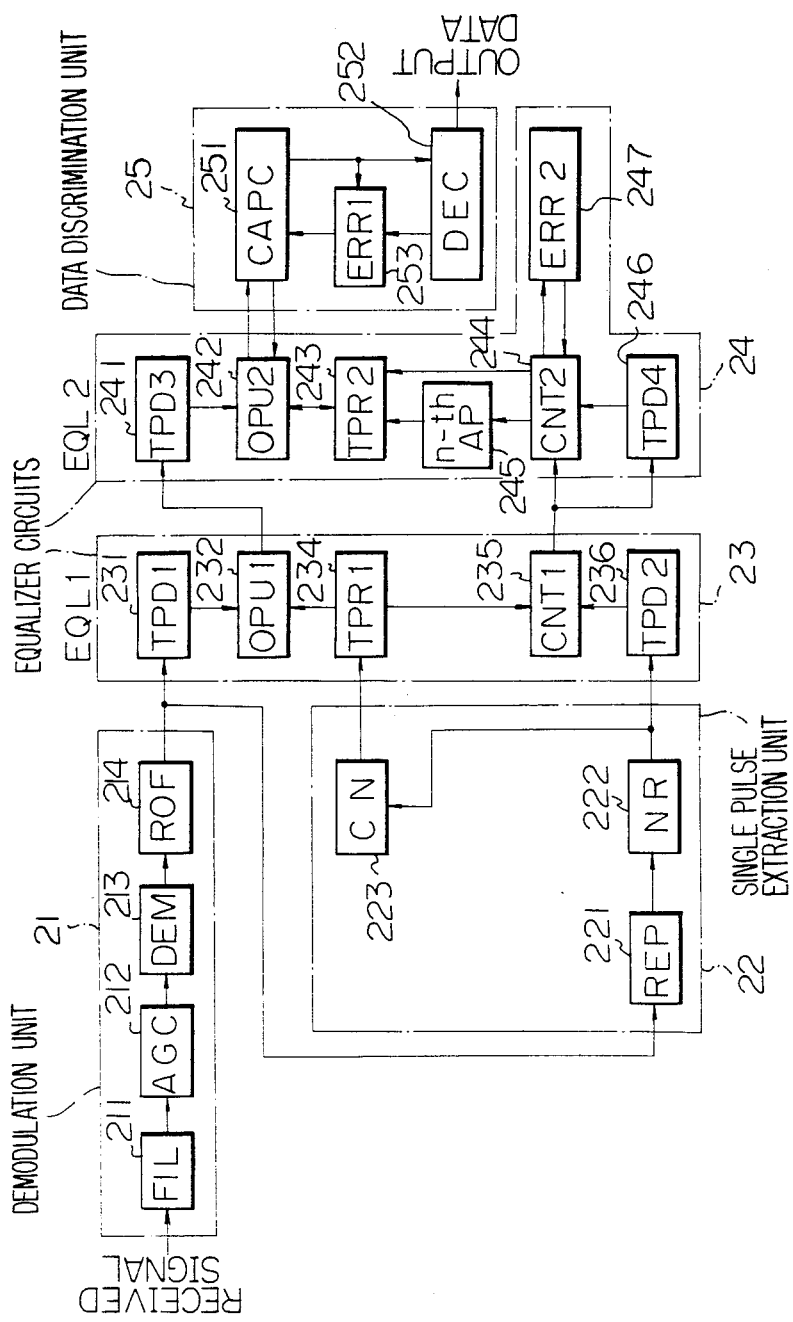
FIG. 5 is a block diagram of the construction of an automatic equalization device in accordance with one embodiment of the present invention.

An automatic equalization device in accordance with one embodiment of the present invention is illustrated in detail in FIG. 5. In FIG. 5, the received signal, after demodulation by the demodulation unit 21, is equalized by the first equalization circuit 23 and the second equalization circuit 24.

The equalized output is data discriminated in the data discrimination unit 25 and then output as output data. On the other hand, during the start-up period, the output signal of the demodulation unit 21 is supplied to the single pulse extraction unit 22, and the first and second equalization circuits 23 and 24 are started up in accordance with the extracted single pulse. The demodulation unit 21 has a filter circuit (FIL) 211 for removing the noise from the received signal, an automatic gain control circuit (AGC) 212 for adjusting the level of the received signal, a demodulation circuit (DEM) 213 for demodulation of the quadrature-amplitude modulation, and a roll-off filter circuit (ROF) 214 for removing the high frequency component from the demodulated signal. The single pulse extraction unit 22 has an extraction circuit (REP) 221 for extracting the data series corresponding to the single pulse signal from the training signal, a normalization circuit (NR) 222 for normalizing the extracted data series, and a complex conjugate derivation circuit (CN) 223 for deriving the complex conjugate data series of the normalized data series. The first equalization circuit (EQL1) 23 has a first tap data register (TPD1) into which the received data from the demodulation unit 21 is written, a first equalized output circuit (OPU1) 232 for calculating the first equalized output from the first tap data and the first tap coefficient, a first tap coefficient register (TPR1) 234 which is initially set by the output data of the complex conjugate derivation circuit 223, a first computing control circuit (CNT1) 235 for calculating the auto-correlation series of the single pulse signal, and a second tap data register (TPD2) 236 into which the data series from the normalization circuit 222 is written. The second equalization circuit (EQL2) 24 has a third tap data register (TPD3) 241 into which the first equalized output data is written, a second equalized output circuit (OPU2) 242 for calculating the second equalized output from the third tap data and the second tap coefficient, a second tap coefficient register (TRP2) 243, a second computing control circuit (CNT2) 244 for calculating the equalized output from the auto-correlation series of the single pulse and the second tap coefficient and for correcting the second tap coefficient in accordance with the error of the equalized output to the reference output Ref, an n-th order approximation circuit (n-th AP) 245 for obtaining the n-th order approximation of the inverse matrix from the auto-correlation series, a fourth tap data register (TPD4) 246 into which the auto-correlation series of the single pulse is written, and an error calculation circuit (EPR2) 247 for calculating the error of the equalized output to the reference output using the auto-correlation series of the single pulse. The data discrimination unit 25 has a carrier automatic phase control circuit (CAPC) 251, a discrimination circuit 252, and an error calculation circuit (ERR1) 253. The circuits in the data discrimination unit 25 are disclosed, for example, in Japanese Pat. No. 1,041,066, thus are not described herein.

In accordance with the above-mentioned method of starting-up the automatic equalization device according to the present invention, by calculation of the symmetric inverse matrix enables reduction of the calculation time of the tap coefficient. For example, it is possible to reduce the time required for start up compared with the prior art disclosed in the above-mentioned U.S. Pat. No. 3,962,637.

In addition, in accordance with the method of starting-up the automatic equalization device of starting-up the automatic equalization device according to the present invention, use of a signal including the carrier signal continuously as the signal for extracting a single pulse enables prevention of asynchronism.

INDUSTRIAL APPLICABILITY

The present invention can be applied for increasing the data transmission efficiency in a multipoint communication system.

We claim:

1. An automatic equalization device used in a communication system in which a transmitter and a receiver are connected by a transmission line, said transmitter including a means for transmitting an initialization signal including a component of a single pulse and subsequently transmitting a data signal, said receiver including said automatic equalization device for correcting the received signal and deriving the data signal transmitted from said transmitter, said automatic equalization device comprising:
   a means for extracting a single pulse having a distortion due to the characteristics of the transmission line from the received initialization signal;
   a means for deriving a coefficient for obtaining an auto-correlation or a cross-correlation series using said extracted single pulse;
   a first equalization circuit for correcting said extracted single pulse into a symmetric single pulse and correcting the data signal by the coefficient obtained by said deriving means;
   a generating means for generating a coefficient for deriving a single pulse coinciding with the single pulse included in the initialization signal transmitted from said transmitter, using said symmetric single pulse; and
   a second equalization circuit for correcting the data signal based on the coefficient obtained by said generating means.

2. A data communication system comprising:
   transmitting means for transmitting a training signal and a data signal;

receiver means for extracting a single pulse signal from said training signal;

auto equalization means having a coefficient set in accordance with said single pulse signal, for equalizing said data signal, said auto equalization means including means for obtaining a complex conjugate series of said extracted single pulse signal;

first equalization circuit means for calculating a series of auto-correlation of said single pulse signal using said obtained complex conjugate series as a tap coefficient, and for correcting said data signal; and second equalization circuit means for calculating a data series which is the inverse matrix of said auto-correlation series, for initializing said data series, which is the inverse matrix as the tap coefficient, and for correcting said data signal using said tap coefficient.

3. A data communication system according to claim 2, wherein said means for obtaining the complex conjugate series includes a normalizing means for normalizing said single pulse signal.

4. A data communication system according to claim 2, wherein said means for obtaining the inverse matrix of said auto-correlation series is derived as a first order approximation from the data series $B_J$ using the following expressions in the form of:

$$B_J = A_{-J} \quad (J \neq 0)$$

$$B_{-J} = -A_J \quad (J \neq 0)$$

$$B_O = A_O = (1, 0) \quad \text{(complex number)},$$

where $B_J$ is the J-th data of said data series and $A_J$ and the J-th auto-correlation number.

5. A data communication system according to claim 4, wherein said means for obtaining a data series corresponding to said inverse matrix includes means for employing the Gaus-Seidel method as a sequential approximation method, and said equalization circuit means includes means for obtaining the data series corresponding to said inverse matrix by correcting said data series having the form of:

$$B_J(J=0, \pm 1, \ldots, \pm n)$$

in the sequence $B_0, B_{\pm 1}, \ldots, B_{\pm n}$ and subsequently thereto repeating the correction.

6. A method initializing a coefficient for the correction of a received signal in an automatic equalization device for correcting the received signal transmitted by a transmitter through a transmission line, said method comprising the steps of:

(a) transmitting training signal;

(b) extracting a pulse signal series corresponding to a single pulse signal from the training signal;

(c) obtaining a complex conjugate series of said pulse signal series and setting said obtained complex conjugate series as a first equalization coefficient;

(d) obtaining a correction series between said first equalization coefficient and said pulse signal series; and (e) setting the data series corresponding to the inverse matrix of said correlation series as a second equalization coefficient.

7. A method according to claim 6, further comprising the step of:

synthesizing said first equalization coefficient and said second equalization coefficient and said second equalization coefficient into another equalization coefficient in accordance with the convolutional operation.

8. A method for initially setting a coefficient of an automatic equalization device in a data communication system, in which a training signal including components of a single pulse signal is transmitted by a transmitter and a single pusle signal is extracted from said training signal by a receiver, and setting an initial coefficient of said automatic equalization device using said extracted single pulse signal, said method comprising the steps of:

(a) receiving said training signal;

(b) generating a delayed training signal;

(c) adding the received training signal and the delayed training signal to produce an extracted single pulse signal; and (d) initially setting a coefficient of said automatic equalization device in the receiver using said extracted single pulse signal.

* * * * *